United States Patent [19]

Gardner et al.

[11] Patent Number: 4,657,116
[45] Date of Patent: Apr. 14, 1987

[54] VIBRATION-ISOLATING APPARATUS

[75] Inventors: Terry N. Gardner; James N. Brekke; Lawrence P. Krolikowski, all of Houston; Raymond E. Dextraze, Dallas, all of Tex.

[73] Assignee: Exxon Production Research Co., Houston, Tex.

[21] Appl. No.: 756,558

[22] Filed: Jul. 17, 1985

Related U.S. Application Data

[63] Continuation of Ser. No. 354,562, Mar. 4, 1982, abandoned.

[51] Int. Cl.$^4$ ............................................... B66B 9/00
[52] U.S. Cl. .................................... 187/1 R; 166/341; 405/212; 114/312
[58] Field of Search .................. 187/1 R, 95; 405/211, 405/212, 195, 188, 184; 166/335, 362, 367, 359, 341, 338; 248/358 A, 18; 114/312, 270, 219; 175/5, 7

[56] References Cited

U.S. PATENT DOCUMENTS

| | | | |
|---|---|---|---|
| 2,784,559 | 3/1957 | Kajmo | 114/312 |
| 2,981,347 | 4/1961 | Bauer et al. | 114/312 |
| 3,215,202 | 11/1965 | Pollard et al. | 166/341 |
| 3,400,848 | 9/1968 | Shaler et al. | 114/312 |
| 3,626,703 | 12/1971 | Richburg | 114/312 |
| 3,924,830 | 12/1975 | Collard et al. | 248/358 A |
| 3,977,200 | 8/1976 | Manttamen | 405/195 |
| 4,031,544 | 6/1977 | Lapetina | 358/99 |
| 4,043,708 | 8/1977 | Greenfield | 417/363 |
| 4,058,945 | 11/1977 | Knapp | 114/312 |
| 4,113,064 | 9/1978 | Shigata et al. | 187/1 R |
| 4,136,633 | 1/1979 | Homen et al. | 175/5 |
| 4,167,215 | 9/1979 | Thorne | 166/341 |
| 4,174,011 | 11/1979 | Zaremba | 175/7 |
| 4,399,764 | 8/1983 | Menz | 405/211 |
| 4,428,460 | 1/1984 | Luinstma | 187/1 R |
| 4,446,806 | 5/1984 | Loire | 405/212 |

FOREIGN PATENT DOCUMENTS

| | | | |
|---|---|---|---|
| 1431865 | 10/1965 | Fed. Rep. of Germany | 187/1 R |
| 642815 | 11/1960 | Italy | 114/312 |
| 65615 | 5/1980 | Japan | 405/212 |

Primary Examiner—Joseph J. Rolla
Assistant Examiner—Kenneth Noland
Attorney, Agent, or Firm—Alan J. Atkinson

[57] ABSTRACT

A vibration-isolating apparatus for protecting equipment from excessive vibrations. The apparatus discloses an equipment-carrying frame attached by shock-absorbing members to a guide member. The guide member is loosely fastened in operational relationship wth a drillpipe or casing to permit movement of the apparatus. The apparatus is lowered along the drillpipe or casing by a cable or other locomotive means controlled from the surface. Vibration of the drillpipe created by ocean currents or waveloading forces causes the drillpipe to impact and vibrate the guide member of the apparatus. The shock-absorbing members protect equipment attached to the frame by attenuating the excessive vibrations induced by the drillpipe on the apparatus. Shock-absorbing members of varying stiffness can be substituted to attenuate the differing vibrational forces exerted by each particular drillpipe. The stiffness of the shock-absorbing members is preferably selected to provide the optimal combination of rigidity and damping properties necessary to protect the equipment.

12 Claims, 5 Drawing Figures

U.S. Patent Apr. 14, 1987 Sheet 1 of 2 4,657,116
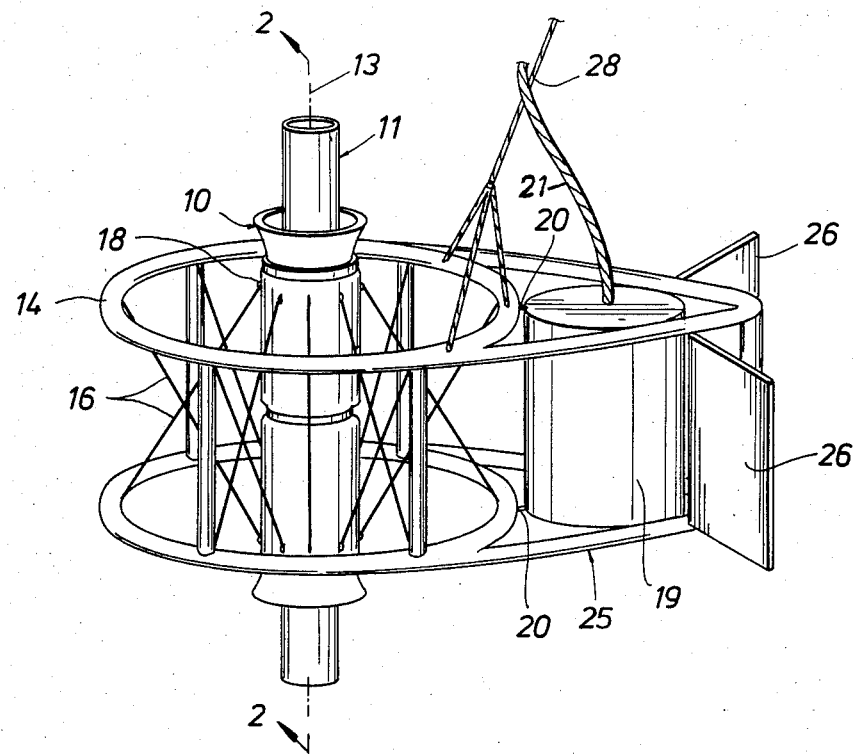
FIG.1
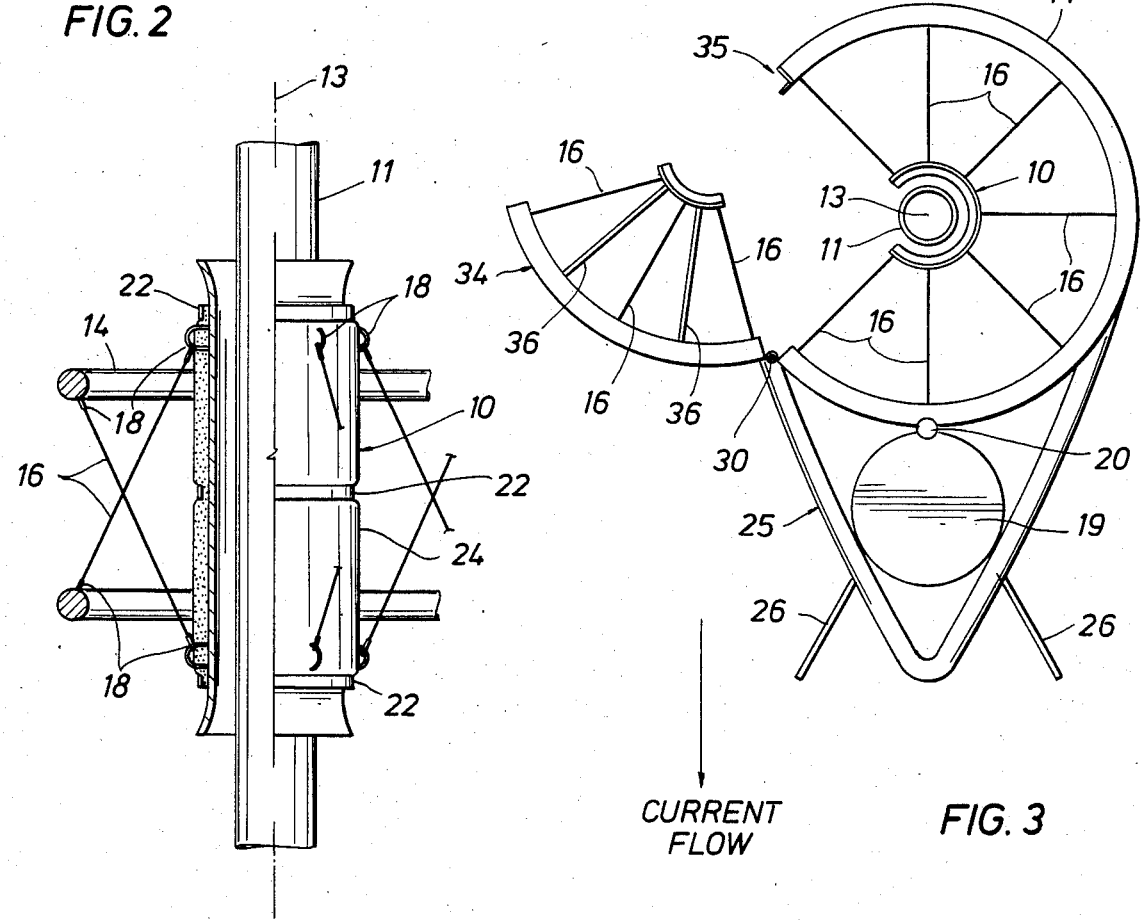
FIG.2
CURRENT FLOW
FIG.3

VIBRATION-ISOLATING APPARATUS

This application is a continuation of Ser. No. 06/354,562, filed Mar. 4, 1982, now abandoned.

BACKGROUND OF THE INVENTION

1. Field of the Invention

The present invention relates to the protection of sensitive equipment from damaging vibrations created by external forces. More particularly, the present invention relates to a vibration-isolating apparatus for transporting equipment during subsea drilling operations.

2. Description of the Prior Art

The expanding search for oil and gas has extended drilling operations from shallow coastal regions into deeper water. As the depth of the water increases, the ability to monitor or directly control submerged equipment becomes more arduous. Divers are frequently used in shallow drilling operations, yet the problems of decompression and the deficiencies of isobaric diving may limit efficient diving operations to depths of 600 feet. While the range of conventional diving operations is limited to shallow water, subsea drilling operations frequently extend to depths greater than 1000 feet.

At greater drilling depths, many drilling and production operations are controlled remotely. Underwater television cameras and other equipment are lowered from a drillship or platform to perform a variety of services. Television cameras are routinely used to observe the landing of subsea equipment, cementing, and tool operations. Ultrasonic equipment is utilized in nondestructive testing to identify corrosion and other deficiencies in submerged equipment. The remote control of similar operations has proven indispensable in directing efficient subsea drilling operations.

Various guidance systems have been developed to transport equipment to the ocean floor. Guidelines attached between the sea floor and a drillship or platform are commonly used to guide equipment to a subsea wellhead. U.S. Pat. No. 3,184,541 illustrates a television camera deployed along a system of four guidelines anchored by a weighted guidebase to the ocean floor.

The use of guidelines is economical and reliable for drilling depths approaching 1800 to 2000 feet. Yet guidelines can prove impractical at greater drilling depths because of the increased size of the guidelines and guideline handling equipment required to manipulate a larger guideline system. Large guideline systems are not only expensive and unwieldly, but at greater depths the guidelines and drillpipe may become tangled due to ocean currents and vessel drift.

Consequently, guidelineless drilling systems have been developed for drilling in ocean depths greater than 2000 feet. Guidelineless systems are particularly appropriate for a dynamically positioned drilling vessel because of vessel movement, within a few degrees of center, about the subsea well. In guidelineless drilling operations, equipment-carrying tools transport equipment along the exterior of the drillpipe or casing. The tools are commonly lowered along the drillpipe by a cable or line controlled from the surface.

The deployment of equipment along the drillpipe in a guidelineless system is satisfactory in a static subsea environment, but the presence of strong ocean currents may induce drillpipe vibrations which jeopardize vibration-sensitive equipment. In a current, the flow of water around the drillpipe can create opposing vortices which are alternately shed from each side of the drillpipe. This vortex shedding creates pulsating forces on the drillpipe transverse and parallel to the current. Under certain circumstances, particularly where these forces correspond with the natural frequencies of the drillpipe, the vortex-induced forcing frequencies can cause the drillpipe to vibrate turbulently. This effect is more pronounced at greater drilling depths because a long drillpipe is exposed to greater current forces and has many natural frequencies.

The forcing vibrations and corresponding movement of the drillpipe induced by current flow can destroy vibration-sensitive equipment deployed near the drillpipe. A need, therefore, exists for an apparatus that will isolate equipment from excessive vibrations produced in a dynamic environment. The apparatus must attenuate a wide range of vibrational frequencies impinging on the apparatus.

SUMMARY OF THE INVENTION

The present invention overcomes the above-described disadvantages by providing an apparatus to transport equipment while protecting the equipment from excessive vibrational forces.

The vibration-isolating apparatus includes a guide member located about a directional guide which directs the deployment of the apparatus. A frame means is located about yet is separated from the guide member. One or more shock-absorbing members connect the guide member to the frame means.

Equipment can be fastened to the frame means for transport along the directional guide. The equipment will be isolated from resonant vibrations in the guide member by the shock-absorbing members. The vibration-isolating apparatus attenuates a wide range of vibrational amplitudes and frequencies which may be deleterious to equipment. The vibration-isolating apparatus is particularly suited to varying directional guides and to conditions where the vibrational forces vary along the directional guide.

BRIEF DESCRIPTION OF THE DRAWINGS

In order that the features of this invention may be better understood, a detailed description of the invention as illustrated in the attached drawings follows:

FIG. 1 depicts an isometric view of the vibration-isolating tool disposed about a directional guide;

FIG. 2 is a partial sectional view taken along line 2—2 of FIG. 1, and illustrating a detailed guide member;

FIG. 3 is a plan view illustrating the relationship between the guide member, frame means, shock-absorbing member, and hinged provisions for installing the apparatus about a directional guide.

DESCRIPTION OF THE PREFERRED EMBODIMENT

Figure 4A:
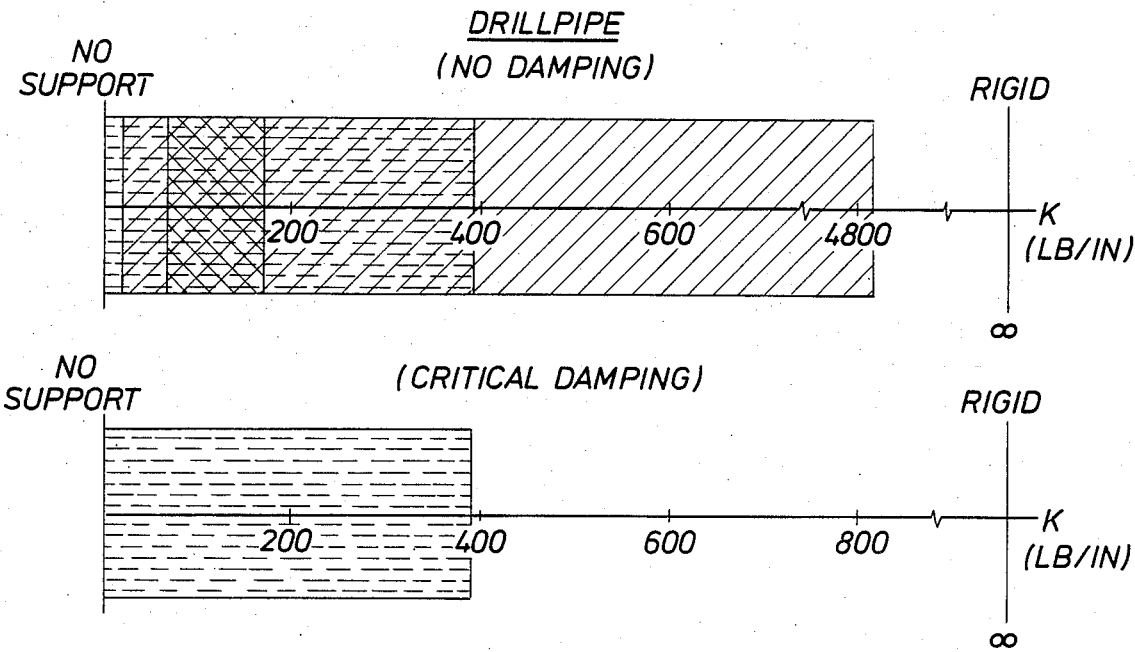
FIGS. 4 (A and B) illustrate line graphs with a horizontal scale depicting shock-absorbing member stiffness. The graphs correlate the relationship between shock-absorbing member stiffness and regions of vibrational resonance and contact probability for two specific directional guides.

With reference to FIGS. 1-3, and with particular reference to FIG. 1, a vibration-isolating apparatus is illustrated. A guide member 10 is mounted in operational relationship with a directional guide 11 having a longitudinal axis 13. The directional guide 11 is used to position the guide member 10 as the guide member 10 is deployed. Located about, yet spatially separated from the guide member 10 is a frame means 14. The guide member 10 is connected to the frame means 14 by a plurality of shock-absorbing members 16 which allow relative movement between the guide member 10 and frame means 14 while mitigating contact therebetween. The shock-absorbing members 16 are attached at each end by suitable shackle means 18.

The present invention is especially suitable for the transport of equipment 19 along a directional guide 11 in a subsea environment. The equipment 19 is attached to the frame means 14 by any suitable fastening means 20. The invention protects the equipment 19 by isolating it from excessive vibrations or shock caused by violent motion of the directional guide 11. The equipment 19 deployed can include television cameras, lights, ultrasonic or data gathering instrumentation, or any other equipment. An umbilical cable 21 can be operated from a console on a floating vessel (not shown) to supply power to the equipment 19.

Referring to FIG. 2, the guide member 10 is preferably an elongated cylinder, yet its shape need not be limited to a cylinder or an elongated member. The guide member 10 can be deployed along the directional guide 11 to transport the equipment 19. The ends of guide member 10 may preferably be flanged to traverse pipeline joints along the directional guide 11 that are encountered by the guide member 10.

The guide member 10 is depicted in FIGS. 1-3 as being in an operational relationship with the directional guide 11. To achieve this operational relationship, the guide member 10 is preferably constructed of two or more detachable segments to permit its ready installation about the directional guide 11. For example, the guide member 10 may be parted lengthwise into sections as illustrated in FIGS. 2 and 3 with an opening sufficiently large to permit insertion of the directional guide 11 therethrough. Following insertion of the directional guide 11 into the sectioned guide member 10, the directional guide 11 can be fastened in a fixed operational relationship with the guide member 10 by binding the sections of the guide member 10 into a unitive member. Any suitable fastening means such as bands 22 can be used to bind the guide member 10 sections. The bands 22 can preferably be manufactured from galvanized steel, stainless steel, or Kevlar (a Dupont Trademark fiber with a strength to weight ratio five times that of steel).

The exterior surface of the guide member 10 can be faced with a resilient material 24 such as rubber or an elastomeric material. The resilient material 24 is secured to the guide member 10 by means of bands 22 as described above. The resilient material 24 performs two functions. First, it dampens internal resonant vibrations within the guide member 10 created by impact between the guide member 10 and a vibrating directional guide 11. Second, extraordinary displacement of the frame means 14 in relation to the guide member 10 could create an impact between these elements. In such an event, the resilient material 24 would cushion the impact between the guide member 10 and the frame means 14.

FIG. 3 illustrates a plan view of the preferred embodiment. As shown, the frame means 14 can be constructed in a cage-like design encircling the guide member 10, yet it need not be limited to this configuration. The frame means 14 is preferably extended in its constuction to enclose the equipment 19. This extension 25 of the frame means 14 would protect the equipment 19 from damaging contact with structures or other objects present in the subsea environment.

The vibration-isolating apparatus is particularly suited for use in a dynamic aqueous environment such as an ocean current. As previously noted, an object placed in a current will be subjected to drag forces induced by the current. To reduce the drag forces exerted on the vibration-isolating apparatus, the frame means 14 may preferably be shaped as a fairing. As illustrated in FIG. 3, fairings are bodies generally tapered in shape from a blunt end to a narrow end and are well-known in the art as a means of reducing the drag forces exerted on an object exposed to a current. A frame means 14 shaped as a fairing would therefore reduce the drag exerted on the frame means 14. As the directional guide 11 vibrates, the frame means 14 would tend to rotate about the directional guide 11. A frame means 14 shaped as a fairing would prevent this rotation. Fixed or detachable fins 26 are preferably attached to the frame means 14 to stabilize the rotation of the frame means 14 about the directional guide.

The shock-absorbing members 16 may be fashioned from any flexible medium not limited to springs or other elastic materials. A singular shock-absorbing member 16 composed of an elastic medium such as a foam may be disposed between the frame means 14 and guide member 10. A plurality of another type of shock-absorbing members 16 can be utilized as illustrated in FIGS. 1-3. The shock-absorbing members 16 selected for the preferred embodiment are commonly known as "bungee cords" and may be purchased from Thomas Taylor & Sons of Hudson, Mass. Each bungee cord is composed of an inner core of pliable rubber surrounded by a protective covering of woven fabric.

The shock-absorbing members 16 can be connected in various orientations between the guide member 10 and frame means 14. For example, the shock-absorbing members 16 can be oriented diametric about the guide member 10. As illustrated in FIGS. 1 and 2, the shock-absorbing members 16 can be fastened in pairs in a decussate fashion between the guide member 10 and frame means 14. This orientation would prevent rotation of the frame means 14 about a plane perpendicular to the longitudinal axis 13 of the directional guide 11. Furthermore, this decussate configuration allows the advantageous use of longer shock-absorbing members 16 in the vibration-isolation apparatus. Longer shock-absorbing members 16 increase the damping capability of the apparatus because a longer shock-absorping member can be maintained in tension throughoiut a wide range of displacements of the frame means 14 relative to the guide member 10.

The shock-absorbing members 16 are preferably pre-tensioned as they are installed. This pre-tensioning minimizes the possibility of slackness in the shock-absorbing members 16 and corresponding damage to the apparatus upon the extraordinary displacement of the frame means 14 in relation to the guide member 10.

The vibration-isolating apparatus protects equipment by attenuating vibrations induced by the directional guide 11. In a current, vortices alternately shed from both sides of a directional guide 11 will vibrate the directional guide 11. As the directional guide 11 vibrates it will induce a range of vibrational frequencies within the apparatus as more fully described below. Because this range of vibrations will vary according to the dimensions and composition of each directional guide 11 as well as the velocity of the current, the shock-absorbing members 16 must be tailored to each application of the vibration-isolating apparatus.

The appropriate shock-absorbing members 16 used in the preferred embodiment are selected according to their stiffness. Stiffness is measured by determining the distance each shock-absorbing member 16 elongates when exposed to a given tensile force. Units of stiffness may therefore be expressed in units of pounds per inch (lb/in). If the elasticity of the rubber core and the weave for the woven covering of each shock-absorbing member 16 is constant, the stiffness for each shock-absorbing member 16 in the preferred embodiment will vary according to its outside diameter. In general, the stiffness of a shock-absorbing members 16 will increase as its diameter increases.

Figure 4B:
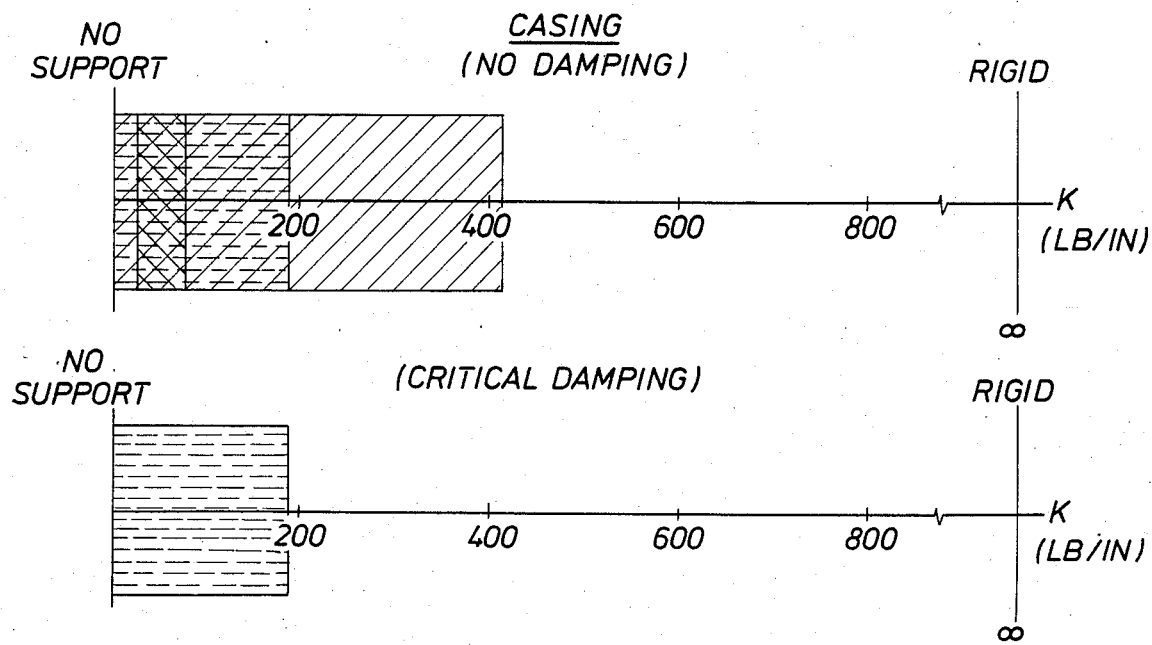

In selecting the appropriate stiffness of shock-absorbing members 16, two primary factors jeopardize the survival of equipment 19 transported by the present invention. First, the shock-absorbing members must be sufficiently stiff to mitigate contact between the frame means 14 and guide member 10. Second, the shock-absorbing members 16 must be sufficiently flexible to dampen excessive vibrations induced by the directional guide 11. As the stiffness of the shock-absorbing members 16 is reduced, the probability of contact between the frame means 14 and guide member 10 will increase. Such contact could damage the vibration-isolating apparatus and the equipment 19 transported by the apparatus. The range of shock-absorbing members 16 insufficiently stiff to minimize contact between the frame means 14 and guide member 10 is labeled herein as a range of "Contact Probability" and is illustrated in FIGS. 4A and 4B. While contact can occur at nearly all stiffnesses of shock-absorbing members, this Contact Probability range includes shock-absorbing member 16 stiffnesses sufficiently flexible that the frame means 14 is excessively offset from its equilibrium position relative to the guide member 10 when exposed to a current. Because this offset would reduce the distance between the frame means 14 and guide member 10, an offset would increase the possibility of contact between the frame means 14 and guide member 10. As the stiffness of the shock-absorbing members 16 is increased, the probability of contact between the frame means 14 and guide member 10 will increase, but the shock-absorbing members 16 will attenuate fewer vibrational frequencies than will more flexible shock-absorbing members 16.

With regard to this second factor of vibrational damping, two sources of vibrations should be analyzed. The first source of vibrations occurs as the vibration-isolating apparatus is in contact with and vibrates at the frequency of the directional guide 11. This resonance imparted to the vibration-isolating apparatus correlates with the base vibrational modes of the vacillating directional guide 11 and is termed herein as the "Base Excitation On Mode Resonance." A secondary source of vibrations occurs as the directional guide 11 impacts the inner surface of the guide member 10. This impact, or impulse, creates internal resonant vibrations within the guide member 10 which are then transferred to the connected shock-absorbing members 16. This source of vibrations is termed herein as the "Impulse Resonance" of the vibration-isolating apparatus.

The Contact Probability factor and vibrational sources of Base Excitation On Mode Resonance and Impulse Resonance (as previously defined) will vary in magnitude and effect according to the particular stiffness of each shock-absorbing member 16. As the stiffness of the shock-absorbing members 16 is increased, the probability of contact between the frame means 14 and guide member 10 will be reduced, yet the shock-absorbing members 16 will attenuate a narrower range of vibrations. As the stiffness of the shock-absorbing members 16 is reduced, a wider range of vibrations will be attentuated, yet the probability of contact between the frame means 14 and guide members 10 will be increased.

To determine the optimal stiffness obtained from balancing these competing factors of Contact Probability and vibrational damping, each directional guide 11 should be tested to determine the magnitude of the factors at differing shock-absorbing member 16 stiffnesses. The results of each test can then be plotted to graphically illustrate the relation of each competing factor to shock-absorbing member 16 stiffness.

As illustrated in FIGS. 4A and 4B, the performance of the preferred embodiment has been analyzed. Tests of a prototype vibration-isolating apparatus have verified this analysis. In the tests, a five inch (inside diamter) drillpipe was vibrated at 3-4 Hz and the results were plotted on a bar graph in FIG. 4A. As illustrated, the range of Base Excitation On Mode Resonance vibrations extends over a greater range than the more narrow range of Impulse Resonance vibrations. The range of Impulse Resonance vibrations will therefore be relatively insignificant when compared to the more dominant range of Base Excitation On Mode Resonance vibrations. As illustrated in FIG. 4A, the Base Excitation On Mode Resonance vibrations range from a stiffness near no support to a shock-absorbing member 16 stiffness of 4800 lb/in. The range of the competing factor of Contact Probability extends from no support to a shock-absorbing member 16 stiffness of 400 lb/in.

Using the graph in FIG. 4A, the stiffness of the shock-absorbing members 16 can be selected to achieve varying balances between the factors of Base Excitation On Mode Resonance, Impulse Resonance, and Contact Probability. To determine the optimal balance between these competing factors, a stiffness should be selected in the region where the ranges of these factors intersect. As previously noted, the range of Impulse Resonance is insignificant for the five inch drillpipe when compared to the range of Base Excitation On Mode Resonance. A shock-absorbing member 16 stiffness of 200 lb/in would attenuate a wide range of vibrations but is in the Contact Probability range and would risk some contact between the frame means 14 and guide member 10. A stiffness of 400 lb/in would prevent contact between the frame means 14 and guide member 10 while attenuating a somewhat narrower range of vibrations.

The stiffness of the shock-absorbing members 16 should be selected according to the design criteria considered most important. If the prevention of contact is more important to the survival of the vibration-isolating tool than is the attenuation of a wider range of vibrations, this stiffness of 400 lb/in will preferably be the critical damping stiffness of the apparatus when adapted to a five inch drillpipe. As illustrated in FIG. 4B, an analysis of a twenty inch (outside diameter) casing pipe establish a preferred stiffness of 200 lb/in. for critical damping. Tests of bungee cords demonstrated that ciords ¾ inch in diameter yield a stiffness of approximately 500 lb/in., and this diameter was selected for the prototype apparatus.

As a final step in the testing process, the vibration-isolating apparatus should be tested to determine whether the natural frequencies of the assembled apparatus are equivalent to any dominant forcing frequencies of the drillpipe. If such natural frequencies and forcing frequencies are coincident, the forcing freuencies vibrating the equipment 19 will be amplified instead of reduced by the vibration-isolating apparatus.

To deploy the vibration-isolating apparatus in the preferred embodiment, the guide member 10 is attached in operational relationship with the directional guide 11 as previously described. The frame means 14 is positioned about the guide member 10 and is connected to the guide member 10 by a plurality of shock-absorbing members 16 attached in tension. Equipment 19 is attached to the frame means 14. A control means 28 or any suitable means of locomotion is attached to the vibration-isolating apparatus to transport the apparatus along the directional guide 11.

In an alternative embodiment, the vibration-isolating apparatus need not be dismantled for installation about the directional guide 11. As illustrated in FIG. 3, the frame means 14 and guide member 10 can be sectioned at two corresponding planes parallel to and extending radially outward from the longitudinal axis 13 to form a section assembly 34. The section assembly 34 as illustrated forms a truncated pie shape comprised of partial sections of the frame means 14 and guide member 10 attached by shock-absorbing members 16. A hinge 30 or similar means preferably located on the frame means 14 allows the section assembly 34 to be opened. This permits installation of the apparatus about the directional guide 11 without dismantling the apparatus. Following installation, the section assembly 34 can be fastened by means of a latch 35 or other suitable means. Temporary spacing bars 36 located between the frame means and guide member sections prevent collapse of the section assembly 34 caused by the tensioned shock-absorbing members 16 during installation of the vibration-isolating apparatus. The spacing bars 36 are removed following installation of the apparatus about the directional guide 11.

In an additional embodiment, the frame means 14 and guide member 10 can be sectioned between shock-absorbing members 16 to leave an opening sufficiently large to permit the insertion of the directional guide 11 therethrough. The guide member 10 is then bound about the directional guide 11 by bands 22 or other fastening means. In this embodiment, the apparatus could be installed without removing the shock-absorbing members 16.

The vibration-isolating apparatus protects equipment from damaging vibrational forces as the apparatus is deployed along the directional guide. The vibration-isolating apparatus is designed to permit both longitudinal and rotational movement about the directional guide and is adaptable to directional guides of varying sizes. In addition to providing ease of installation about the directional guide, the design of the vibration-isolating apparatus is particularly suited to conditions where the directional guide forcing frequencies are erratic as well as variable along the length of the directional guide. Because the present invention is adaptable to a variety of applications and differing constructions, it is intended that all subject matter discussed above or shown in the accompanying drawings be interpreted as illustrative and not in a limiting sense.

What is claimed is:

1. A vibration-isolating apparatus for transporting equipment along a vibrating, substantially vertical directional guide having a longitudinal axis and being located in a body of water, comprising:
   a guide member which is disposed in operational relationship with the directional guide and is transportable along the length of the directional guide;
   a frame means connected to the equipment and being disposed about and spatially separated from said guide member to permit relative movement without contact therebetween;
   one or more shock-absorbing members connecting said guide member to said frame means for attenuating vibrations induced by the directional guide which act on the equipment; and
   control means connected to the apparatus for transporting the apparatus along the directional guide to a subsea location and for raising the apparatus to the water surface.

2. A vibration-isolating apparatus as recited in claim 1 wherein said guide member is cylindrical.

3. A vibration-isolating apparatus as recited in claims 1 or 2 wherein said guide member is generally elongated.

4. A vibration-isolating apparatus as recited in claim 1 wherein said guide member is detachably mountable in operational relationship with the directional guide.

5. A vibration-isolating apparatus as recited in claim 1 wherein said frame means is generally shaped as a fairing.

6. A vibration-isolating apparatus as recited in claims 1 or 5, further comprising at least one fin adapted to said frame means.

7. A vibration-isolating apparatus as recited in claim 1 wherein said shock-absorbing member is detachable.

8. A vibration-isolating apparatus as recited in claim 1 wherein two or more shock-absorbing members are positioned in a decussate fashion about said guide member such that said frame means is counterpoised about said guide member.

9. A vibration-isolating apparatus as recited in claim 1 wherein said guide member and said frame means detachably permit the installation of the apparatus into an operational relationship with the directional guide.

10. A vibration-isolating apparatus as recited in claim 1 wherein the apparatus is rotatably movable around the longitudinal axis of the directional guide.

11. A vibration-isolating apparatus as recited in claim 1 wherein said shock-absorbing members are sufficiently stiff to prevent contact between said guide member and said frame means.

12. A method for transporting equipment by means of a vibration-isolating apparatus, which comprises a guide member, frame means, and shock-absorbing members, along a vibrating, substantially vertical directional guide having a longitudinal axis and being located in a body of water, said method comprising the steps of:
   mounting said guide member in operational relationship with the directional guide, positioning said frame means about said guide member, said frame means being attached to the equipment;
connecting said frame means to said guide member by means of at least one shock-absorbing member capable of attenuating vibrations induced by the directional guide which act on the equipment;
transporting the apparatus along the directional guide to a subsea location, with a control means connected to the apparatus; and
raising the apparatus to the water surface.

* * * * *